(12) United States Patent
Fujii et al.

(10) Patent No.: US 10,207,212 B2
(45) Date of Patent: Feb. 19, 2019

(54) FILTER MATERIAL

(75) Inventors: Hideaki Fujii, Tokyo (JP); Yoshiyuki Tadokoro, Tokyo (JP); Satoru Tezuka, Tokyo (JP); Kiyoshi Miyaji, Tokyo (JP); Tatsuya Ogawa, Tokyo (JP); Saori Tanaka, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 837 days.

(21) Appl. No.: 14/343,595

(22) PCT Filed: Sep. 9, 2011

(86) PCT No.: PCT/JP2011/070627
§ 371 (c)(1),
(2), (4) Date: Mar. 7, 2014

(87) PCT Pub. No.: WO2013/035201
PCT Pub. Date: Mar. 14, 2013

(65) Prior Publication Data
US 2014/0231337 A1    Aug. 21, 2014

(51) Int. Cl.
*B01D 39/16*  (2006.01)
*B01D 35/00*  (2006.01)
(Continued)

(52) U.S. Cl.
CPC .......... *B01D 39/1623* (2013.01); *B01D 29/11* (2013.01); *B01D 29/111* (2013.01); *B01D 35/005* (2013.01); *B32B 5/022* (2013.01); *B32B 5/26* (2013.01); *D04H 1/498* (2013.01); *D04H 3/11* (2013.01); *D04H 3/16* (2013.01); *D04H 5/03* (2013.01); *F02M 37/22* (2013.01); *B01D 2239/065* (2013.01); *B01D 2239/0627* (2013.01); *B01D 2239/1233* (2013.01); *B32B 2250/20* (2013.01); *B32B 2262/0284* (2013.01);
(Continued)

(58) Field of Classification Search
CPC .... B01D 39/16; B01D 39/1623; B01D 35/02; B01D 35/00; B01D 35/005; B01D 29/11; B01D 29/111; F02M 37/22
USPC .................................. 210/483, 507; 156/60
See application file for complete search history.

(56) References Cited

U.S. PATENT DOCUMENTS

2007/0295659 A1   12/2007   Rygalski et al.
2008/0070022 A1   3/2008    Umezu et al.

FOREIGN PATENT DOCUMENTS

CN    102039062 A    5/2011
JP    59-36757       2/1984
(Continued)

OTHER PUBLICATIONS

English translated versions of JP 2006-187710.*
(Continued)

*Primary Examiner* — Robert Clemente
*Assistant Examiner* — Akash K Varma
(74) *Attorney, Agent, or Firm* — Finnegan, Henderson, Farabow, Garrett & Dunner, LLP (57) ABSTRACT

Provided is a filter material which can enhance the particle holding capacity of a filter while keeping the particle capture efficiency thereof and which thus ensures a prolonged filter life. The present invention pertains to a filter material comprising a spun lace nonwoven fabric which contains a thermoplastic synthetic filament nonwoven fabric as the intermediate layer.

9 Claims, 7 Drawing Sheets

(51) Int. Cl.
*B01D 29/11* (2006.01)
*F02M 37/22* (2006.01)
*D04H 1/498* (2012.01)
*D04H 3/11* (2012.01)
*D04H 3/16* (2006.01)
*D04H 5/03* (2012.01)
*B32B 5/02* (2006.01)
*B32B 5/26* (2006.01)

(52) U.S. Cl.
CPC ... *B32B 2307/718* (2013.01); *B32B 2307/724* (2013.01); *B32B 2307/728* (2013.01); *F02M 2037/228* (2013.01); *Y10T 156/10* (2015.01)

(56) References Cited

FOREIGN PATENT DOCUMENTS

| JP | 64-061555 | | 3/1989 | | |
|---|---|---|---|---|---|
| JP | 01-111056 | | 4/1989 | | |
| JP | 04-153351 | | 5/1992 | | |
| JP | 08-41762 | | 2/1996 | | |
| JP | 08-302553 | * | 11/1996 | ............... | D04H 5/02 |
| JP | 08302553 A | * | 11/1996 | ............... | D04H 5/02 |
| JP | 10-195749 | * | 7/1998 | ............... | D04H 3/00 |
| JP | 10195749 A | * | 7/1998 | ............... | D04H 3/00 |
| JP | 2000-246026 | | 9/2000 | | |
| JP | 2003-236321 | | 8/2003 | | |
| JP | 2006-187710 | * | 7/2006 | ............. | B01D 39/16 |
| JP | 4700968 | | 3/2011 | | |

OTHER PUBLICATIONS

English translated versions of JP 10-195749.*
English translated versions of JP 08-302553.*
English translated version of JP 08302553, Nov. 1996, Nakano.*
English translated version of JP 10195749, Jul. 1998, Matsuoka.*
CN Office Action for CN Application No. 201180073306.4 dated Dec. 31, 2014.
Supplementary European Search Report, issued in European Application No. 11871914.5, dated Jul. 14, 2015, 3 pages.
International Search Report from the Japanese Patent Office for International Application No. PCT/JP2011/070627, dated Jun. 19, 2012.

* cited by examiner

FILTER MATERIAL

TECHNICAL FIELD

The present invention relates to a filter material comprising a spun lace nonwoven fabric which contains a thermoplastic synthetic filament nonwoven fabric as the intermediate layer. More specifically, the invention relates to the aforementioned filter material for a suction filter to be used on the primary side of a fuel pump situated in a vehicle fuel tank.

BACKGROUND ART

In the past, the filter materials employed in filters to be used on the primary side of fuel pumps situated in vehicle fuel tanks (hereunder also referred to as "suction filters") have been ones with fabric meshes, spunbond nonwoven fabrics or melt blowing nonwoven fabrics, and it has been desired for such filter materials to exhibit excellent capturing performance for particles of around 5 to 50 μm, and preferably excellent capturing performance for particles of 10 to 30 μm.

Examples of such filter materials include the filter material disclosed in the following patent literature no. 1 (PTL 1), in which a spunbond filtration medium (spunbond nonwoven fabric) or melt blow molded filtration medium (melt blown nonwoven fabric) is layered in an integral manner to form a coarse structure in the interior of the filter material, such that after removing relatively large solids with the spunbond layer, the finer solids are removed by the melt blown layer.

Also, the following PTL 2 discloses the use of a filter layer having two or more synthetic filament nonwoven fabrics layered on the inner layer of an extrusion mesh.

For removal of even finer particles, the following PTL 3 discloses the use of a filter layer having layered a synthetic filament nonwoven fabric made by an electrospinning method, instead of the aforementioned melt blown nonwoven fabric.

However, a nonwoven fabric made by a conventional spunbond method, melt blowing method or electrospinning method does not necessarily have a uniform fiber arrangement when viewed within a given small area, and it therefore lacks homogeneity of spacing between fibers, while also having a large variation in the properties relating to filter performance, such as basis weight, fiber diameter and air permeability. Because such variation manifests as variation in the performance of the filter material such as capturing performance and filter life, it is difficult to maintain stable filter performance when the filtration area is a small area of about 50-500 cm$^2$, and therefore such materials have been considered unsuitable as filter materials to be used as suction filters.

In addition, when a synthetic filament nonwoven fabric such as a spunbond nonwoven fabric is used as the filter material, there have been problems in terms of capture efficiency for fine particles. In other words, it is difficult to obtain fiber diameters of 10 μm or smaller for fibers molded by spunbond methods, and in order to obtain the desired particle capturing performance, it is necessary to carry out a subsequent step such as surface smoothing after formation of the spunbond nonwoven fabric. In this case, high capture efficiency is exhibited similar to a synthetic filament nonwoven fabric such as a melt blown nonwoven fabric or electrospinning nonwoven fabric, but the manner of capturing is surface filtration, and a problem occurs in that the filter medium surface becomes obstructed prematurely by the particles, resulting in a short filter life.

In order to solve this problem, the following PTL 4 discloses a spun lace nonwoven fabric employing a thin woven fabric in the intermediate layer as a filter material for a suction filter.

This spun lace nonwoven fabric increases the amount of interior capturing of particles compared to a spunbond nonwoven fabric or melt blown nonwoven fabric, and therefore a relative life extension effect is obtained. However, the woven fabric section used as the intermediate layer in the spun lace nonwoven fabric does not allow passage of fluids, and therefore the woven fabric section does not function as a filter material. Consequently, the interior capturing effect for particles is not sufficiently exhibited by the spun lace nonwoven fabric.

CITATION LIST

Patent Literature

[PTL 1] Japanese Patent Publication No. 4350193
[PTL 2] Japanese Patent Publication No. 4559667
[PTL 3] Japanese Unexamined Patent Publication No. 2009-28617
[PTL 4] Japanese Patent Publication No. 4700968

DISCLOSURE OF THE INVENTION

Problems to be Solved by the Invention

It is an object of the present invention to solve the aforementioned problems of prior art and provide a filter material having sufficient capturing performance for fine particles, and having a long filter life without increase in the filter thickness.

Means for Solving the Problems

As a result of diligent research and experimentation with the aim of achieving this object, the present inventors have completed this invention upon finding that if a spun lace nonwoven fabric having a spunbond nonwoven fabric as the intermediate layer is used as the filter material, it is possible to provide a filter material with a long life at low cost, while maintaining sufficient capturing performance for fine particles, compared to using a woven fabric as the intermediate layer.

Figure 1:
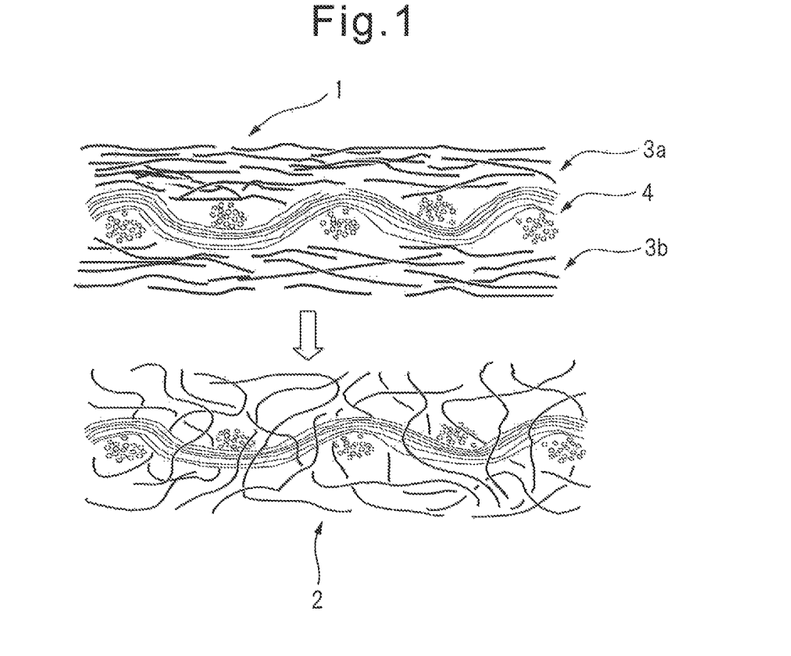
FIG. 1 is a conceptual drawing showing formation of a web by a sheet-forming method, and a method for producing a spun lace nonwoven fabric by columnar stream treatment.
Figure 4:
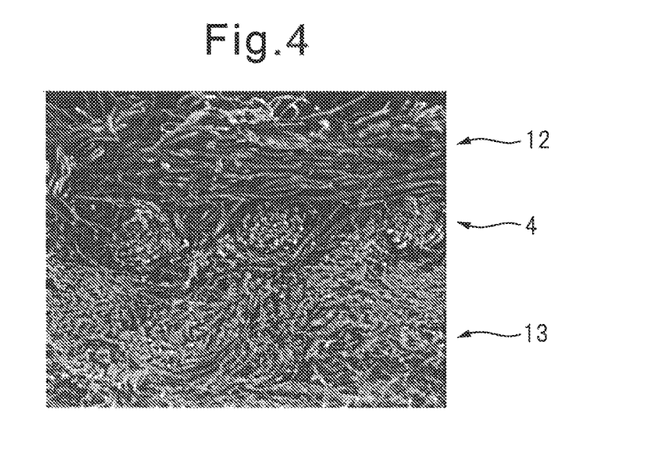
FIG. 4 is a cross-sectional photograph of a spun lace nonwoven fabric using a woven fabric as the intermediate layer.

During production of a spun lace nonwoven fabric, it is common to use a woven fabric being plain woven with a suitable fiber spacing, as the intermediate layer to be used as the reinforcing material, (See FIG. 1 and FIG. 4). This is because deaeration of air incorporated in the step of interlacing treatment of the staple fibers, such as a columnar stream step, is facilitated, and normally, it has larger voids on the plane than a nonwoven fabric, and because it can minimize the water pressure necessary for a columnar stream. In contrast, when a thermoplastic synthetic filament nonwoven fabric having filaments evenly dispersed on the plane is used as the intermediate layer, deaeration of air incorporated during steps such as a columnar stream step is not facilitated, and columnar stream treatment with high water pressure has been necessary.

Figure 5:
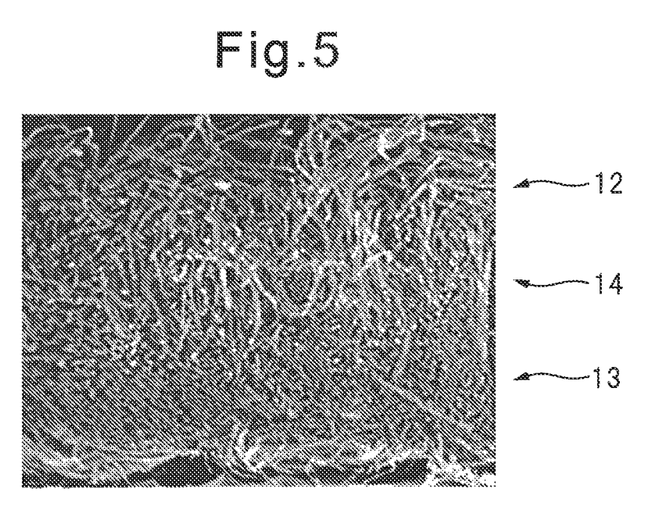
FIG. 5 is a cross-sectional photograph of a spun lace nonwoven fabric according to the present application using a spunbond nonwoven fabric as the intermediate layer.

The present inventors have found that, by using a thermoplastic synthetic filament nonwoven fabric as the intermediate layer, a more stepwise graded structure is formed in the thickness direction of the spun lace nonwoven fabric and an interior capture function is exhibited over the total volume of the spun lace nonwoven fabric, and the invention has been completed upon this finding (see FIG. 4 and FIG. 5).

Specifically, the present invention provides the following.

[1] A filter material comprising a spun lace nonwoven fabric which contains a thermoplastic synthetic filament nonwoven fabric as the intermediate layer.

[2] A filter material according to [1] above, wherein the thermoplastic synthetic fiber nonwoven fabric as the intermediate layer is a spunbond nonwoven fabric having a fiber diameter of 5 to 30 μm and a basis weight of 20 to 160 g/m$^2$, and the layer on one side of the spunbond nonwoven fabric is composed of staple fibers with a fiber diameter of 2 to 15 μm and a basis weight of 30 to 100 g/m$^2$, while the layer on the other side is composed of staple fibers with a fiber diameter of 7 to 25 μm and a basis weight of 50 to 200 g/m$^2$.

[3] A filter material according to [2] above, wherein the aspect ratio (L/D) between the fiber length and fiber diameter of the staple fibers having a fiber diameter of 2 to 15 μm and a basis weight of 30 to 100 g/m$^2$ and the staple fibers having a fiber diameter of 7 to 25 μm and a basis weight of 50 to 200 g/m$^2$ is between 200 and 4000 for both.

[4] A filter material according to [1] above, which is further layered with a spunbond nonwoven fabric that has been pretreated with a water jet.

[5] A filter material according to any one of [1] to [4] above, which is capable of capturing at least 90% of particles of 30 μm and greater, and which has a filter life of at least 30 minutes as measured by the measuring method of JIS-B-8356-8.

[6] A filter material according to any one of [1] to [4] above, which is capable of capturing at least 90% of particles of 20 μm and greater, and which has a filter life of at least 25 minutes as measured by the measuring method of JIS-B-8356-8.

[7] A filter material according to any one of [1] to [4] above, which is capable of capturing at least 90% of particles of 10 μm and greater, and which has a filter life of at least 20 minutes as measured by the measuring method of JIS-B-8356-8.

[3] A filter material having a monofilament woven fabric with a fiber diameter of 30 μm to 100 μm layered on the lowermost flow section of a filter material according to any one of [1] to [4] above.

[9] A filter for vehicle fuel, obtained by heat sealing the edge perimeter of a filter material according to any one of [1] to [4] above to produce a pouch form.

[10] A filter for vehicle fuel formed by heat sealing the edge perimeter of a filter material having a monofilament woven fabric with a fiber diameter of 30 μm to 170 μm layered on the lowermost flow section of a filter material according to any one of [1] to [4] above, to form a pouch form.

Effect of the Invention

The effect exhibited by the present invention may be summarized as follows.

(i) By using a spunbond nonwoven fabric as the intermediate layer of a spun lace nonwoven fabric, fuel passage takes place through the intermediate layer that in the prior art has inhibited passage of fuel and the like due to being a woven fabric, and the filter life is extended since it has the function of holding trapped fine particles.

(ii) It is possible to change the fiber diameter in the thickness direction of the nonwoven fabric and further increase the graded function that sequentially captures particles with different sizes, compared to a spun lace nonwoven fabric in which the intermediate layer is a woven fabric, and the filter life is extended.

(iii) Cost can be reduced compared to using a woven fabric as the intermediate layer.

BRIEF DESCRIPTION OF THE DRAWINGS

(a) Monofilament woven fabric, fiber diameter=150 μm, 45 mesh (b) Monofilament woven fabric, fiber diameter=70 μm, 50 mesh (c) Spunbond nonwoven fabric, fiber diameter=13.5 μm, 40 g/m$^2$ (d) Spunbond nonwoven fabric, fiber diameter=13.5 μm, 25 g/m$^2$

EMBODIMENT FOR CARRYING OUT THE INVENTION

The present invention will now be explained in greater detail.

The present invention is a filter material comprising a spun lace nonwoven fabric which contains a thermoplastic synthetic filament nonwoven fabric as the intermediate layer.

The spun lace nonwoven fabric to be used as a filter material according to the invention preferably has an intermediate layer comprising a spunbond nonwoven fabric with a fiber diameter of 5 to 30 μm and a basis weight of 20 to 160 g/m$^2$, and the layer on one side of the spunbond nonwoven fabric is composed of staple fibers with a fiber diameter of 2 to 15 μm and a basis weight of 30 to 100 g/m$^2$, while the layer on the other side is composed of staple fibers with a fiber diameter of 7 to 25 μm and a basis weight of 50 to 200 g/m$^2$. The aspect ratio (L/D) between the fiber length and fiber diameter of the staple fibers having a fiber diameter of 2 to 15 μm and a basis weight of 30 to 100 g/m² and the staple fibers having a fiber diameter of 7 to 25 μm and a basis weight of 50 to 200 g/m² is between 200 and 4000 for both.

If the fiber diameter, basis weight and L/D of the fibers composing the spun lace nonwoven fabric are within these ranges, the spun lace nonwoven fabric will have a high tangling effect in the tangling treatment, which is characteristic of spun lace nonwoven fabrics, and it will be possible to accomplish tangling of the fibers with a short spacing in the three-dimensional direction. Consequently, the spun lace nonwoven fabric will have a uniform fiber arrangement in the surface direction and the thickness direction, and can exhibit adequate filter performance for capturing of desired fine particles. Furthermore, if the fibers above and below the intermediate layer nave such a construction, it is possible to provide a graded function in which the fiber diameters vary in the thickness direction of the nonwoven fabric, and maintain fine particle diameters that differ for each layer to allow the filter life to be extended.

Throughout the present specification, a "spun lace nonwoven fabric" refers to a nonwoven fabric having staple fibers formed into a web and fibers tangled by a high-pressure water jet, examples thereof including nonwoven fabrics with three-dimensional tangling produced by a high-pressure columnar stream, such as a carded web, random web or wet-formed web. A wet-formed superfine fiber nonwoven fabric employing superfine staple fibers to produce a wet-formed web and having three-dimensional tangling by a high-pressure columnar stream, is preferred as a nonwoven fabric for a suction filter, from the viewpoint of obtaining uniform physical properties that affect the filter performance, such as basis weight, thickness and air permeability, and excellent capture efficiency for fine particles, compared to a synthetic filament nonwoven fabric such as a spunbond nonwoven fabric or melt blown nonwoven fabric.

According to the invention, the spunbond nonwoven fabric to be used as the intermediate layer of a spun lace nonwoven fabric may be produced by a known method. An example is a method in which a synthetic resin is heated and melted with an extruder and then extruded and stretched through a spinneret to obtain a continuous filament, after which a web of the uniformly dispersed filament is bonded by thermocompression bonding with an embossing roll or the like.

As mentioned above, based on the relationship between the fiber diameter and basis weight of the staple fibers situated above and below, the fiber diameter of the spunbond nonwoven fabric is preferably 5 to 30 μm, more preferably 7 to 20 μm and even more preferably 10 to 15 μm. The basis weight is preferably 20 to 160 g/m², more preferably 25 to 120 g/m² and even more preferably 30 to 80 g/m², in consideration of stable running performance with a high water pressure columnar stream during tangling of the staple fibers. If the basis weight is less than 20 g/m², the fibers above and below will migrate into the opposing layers during columnar stream treatment, tending to impair the graded function. If it is 160 g/m² or greater, on the other hand, the drainage property in the sheet formation step will tend to be impaired, air will not be discharged during the high water pressure columnar stream treatment, and tangling between the staple fibers and the spunbond nonwoven fabric used as the intermediate layer may be inhibited.

The materials for the staple fibers and the thermoplastic synthetic filament nonwoven fabric to be used as the intermediate layer may be nylon 6, nylon 66 or copolymerized polyamide-based fibers, olefin-based fibers such as polyethylene, polypropylene or copolymerized polypropylene, or polyester-based fibers such as polyethylene terephthalate or copolymerized polyester. Of these examples, the materials for the staple fibers and the thermoplastic synthetic filament nonwoven fabric to be used as the intermediate layer are preferably polyester-based fibers or polyamide-based fibers, that undergo low swelling with fuel oil and are relatively easy to handle in the lamination step.

Also, since the aforementioned problem is solved, by preventing the air taken in during high water pressure columnar stream treatment from inhibiting tangling between the staple fibers and the spunbond nonwoven fabric used as the intermediate layer, preferably the spunbond nonwoven fabric is subjected to hydrophilic treatment by a known method.

The hydrophilic treatment agent may employ a surfactant such as a cationic surfactant, nonionic surfactant or anionic surfactant, as well as any other appropriate agents that are capable of imparting hydrophilicity. Specific examples include water-soluble solutions of surfactants such as sorbitan fatty acid esters, polyglycerol fatty acid esters and sucrose fatty acid esters, ethyl alcohol solutions, and mixed solutions of water with ethyl alcohol. Such hydrophilic treatment agents may be applied using a known method employing a gravure roll system, kiss roll system, dipping system, spray system or the like. The hydrophilic treatment agent used in the examples which follow was the nonionic surfactant NOPCO WET SN-20T by San Nopco, Ltd., at a concentration of 10%, and it was applied using a kiss coater. Also, the degree of hydrophilicizing of the hydrophilicized material is the degree of absorption within 30 seconds, preferably within 20 seconds and even more preferably within 10 seconds, after dropping a drop of approximately 0.05 cc of purified water from 3 cm above the hydrophilicized spunbond nonwoven fabric using a syringe.

Figure 3:
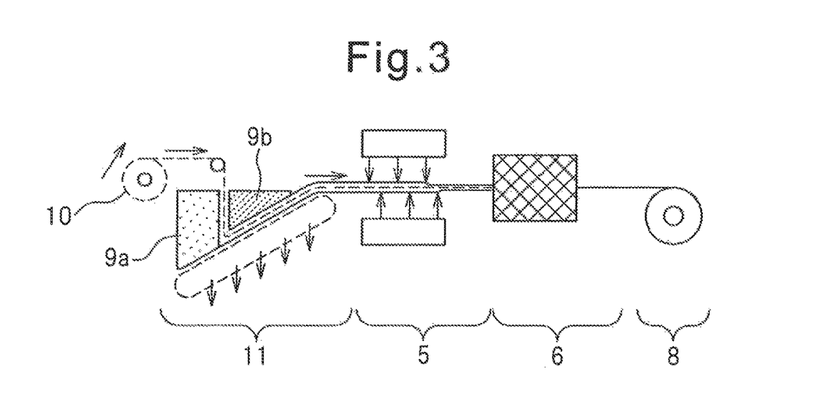
FIG. 3 is a conceptual drawing snowing a tangling step of the intermediate layer with the staple fibers of a spun lace nonwoven fabric.

The spun lace nonwoven fabrics described in the examples of the invention were produced by the method illustrated in FIG. 3, using a known spunbond method to form a nonwoven fabric made from polyethylene terephthalate filaments, hydrophilically treated by the method explained above, and using the obtained spunbond nonwoven fabric as an intermediate layer.

The staple fibers of the invention consist of cut filaments.

The staple fibers to be used in the downstream layer contacting one side of the intermediate layer have fiber diameters of preferably 2 to 15 μm, more preferably 3 to 14 μm and even more preferably 4 to 13 μm, in consideration of the capture efficiency and filter life required as filter performance. With fiber diameters of smaller than 2 μm, high capture efficiency will be obtained but the filter life will be shortened, and sufficient dispersion of the staple fibers will not be obtainable whether producing a sheet-formed web by a spun lace production process, while homogeneity of filter performance between multiple filters will tend to be reduced with small-area use. On the other hand, fiber diameters of greater than 15 μm will lower the capture efficiency and the desired filter performance may not be obtained. The basis weight (weight per unit area) of the downstream layer is preferably 30 to 100 g/m². If it is less than 30 g/m² the desired capture efficiency may not be obtained, and if it is greater than 100 g/m² the capture efficiency will be high but the initial resistance to fluid passage of the filter will be high, tending to reduce the filter life. The L/D ratio of the downstream layer is preferably 200 to 4000. With an L/D ratio of smaller than 200, the staple fibers will not adequately become tangled and the staple fibers will often fall during use of the filter, thereby impairing the filter performance. If it is greater than 4000, on the other hand, sufficient dispersion will not be achieved during production of the sheet-formed web, and homogeneity of the filter performance will tend to be impaired.

The staple fibers to be used in the upstream layer contacting the other side of the intermediate layer have fiber diameters of preferably 7 to 25 μm, more preferably 8 to 20 μm and even more preferably 9 to 18 μm, in consideration of the capture efficiency and filter life required as filter performance. With fiber diameters smaller than 7 μm, the higher capture efficiency will lead to clogging of the upstream layer and shortening of the filter life, while if they exceed 20 μm, the capture efficiency will be reduced, exudation of particles from the downstream layer will increase, and the filter life as a whole will be reduced. The basis weight of the upstream layer is preferably 50 to 200 g/m². If the basis weight is lower than 50 g/m², particles will not be sufficiently captured in the upstream layer and exudation of the particles from the downstream layer will increase, thereby tending to shorten the filter life as a whole. If it exceeds 200 g/m², on the other hand, the capture efficiency will be increased but tangling of the staple fibers by columnar stream treatment will not be accomplished adequately, and the initial air-flow resistance of the filter will be increased, tending to result in decreased filter life. The L/D ratio of the upstream layer is preferably 200 to 4000. If the L/D ratio is smaller than 200 the staple fibers will not become sufficiently tangled and the staple fibers will fail off during use of the filter, thereby impairing the filter performance, while if it is greater than 4000, the dispersion will not be sufficient during production of the sheet-formed web, and homogeneity of the filter performance may be impaired.

For the construction of the spun lace nonwoven fabric layers, it is preferred for the fiber diameters of the staple fibers used in the downstream layer to be smaller than in the upstream layer, in order to satisfactorily exhibit a graded function between the downstream layer and the upstream layer.

Also, by combining two or more different fiber diameters, the staple fibers will have even higher capture efficiency and a construction with a longer life can be achieved. For example, staple fibers of 10 μm and 12 μm may be combined in the upstream, layer and staple fibers of 4 μm and 7 μm in the downstream layer.

Filter materials for suction filters must have the capture efficiency for fine particles required for performance of various types of connected fuel pumps, and must maintain such capture efficiency while also maintaining sufficient filter life. Table 1 below shows the capture efficiency for particles of different particle diameters measured by the method illustrated in FIG. 7, the filter life reached at 10 kPa measured, by the method illustrated in FIG. 8, and the filter life reached at 10 kPa measured by the method illustrated in FIG. 9, for filters according to the invention.

The filter material of the invention employs a spunbond nonwoven fabric as the intermediate layer, and if the spun lace nonwoven fabric employs staple fibers in a specified range, it is possible to significantly increase the filter life while maintaining sufficient capture efficiency for fine particles, as clearly seen from Table 1.

In addition, the filter life can be further extended by lowering the capture efficiency for fine particles by increasing the void percentage using water jet processing or the like, and by using a spunbond nonwoven fabric with increased interior capture volume of large particles (hereunder referred to as "WJ-SB") as a pretreatment layer and layering it on the spun lace nonwoven fabric.

That is, if the upstream layer for fluid passage is the side on which the staple fibers composing the spun lace nonwoven fabric have large fiber diameters, further lamination of a WJ-SB on the upstream layer can impart a function of graded filtration diameter to the spun lace nonwoven fabric. This will prevent rapid obstruction of the spun lace layer when excessively large particles have been supplied, and can effectively contribute to extension of the filter life.

In order to avoid increased pressure loss of the filter as a whole due to clogging of the spunbond nonwoven fabric, and consequent shortening of the filter life, there may be used a spunbond nonwoven fabric with a sufficiently large fiber diameter, or a spunbond nonwoven fabric with a row basis weight. In this case, however, it is not possible to adequately exhibit an effect of the spun lace nonwoven fabric as a pretreatment layer, and the filter life required overall for each nonwoven fabric as a layered body is shorter than when a WJ-SB is layered.

The specific method for producing a WJ-SB may employ a publicly known step of producing a spunbond nonwoven fabric, and the nonwoven fabric made from filaments may be directly subjected to water jet processing after being collected on the net or drum and before contact bonding, to increase the void percentage. Also, the collected spunbond nonwoven fabric may be subjected to water jet processing in a separate step after being contact bonded under low-temperature and low-pressure conditions and wound up, to increase the void percentage. The spunbond nonwoven fabric that has been contact bonded under low-temperature and low-pressure conditions and wound up is preferably such that it has a nonwoven fabric form but the light contact bonding is to an extent allowing the void percentage to be increased by water jet processing. Specifically, it is such that fluffing occurs when the nonwoven fabric surface is lightly rubbed with the hand. More specifically, the surface of the nonwoven fabric made from filaments exhibits fluff by the friction force produced when a No. 3-1 cotton cloth conforming to the color fastness test of JIS-L-0803:2011 is placed on the nonwoven fabric made from filaments obtained as described above, a 500 g weight with a base area of 12.6 cm² is set thereover, and the cotton cloth is then moved 5 cm over the nonwoven fabric.

Figure 2:
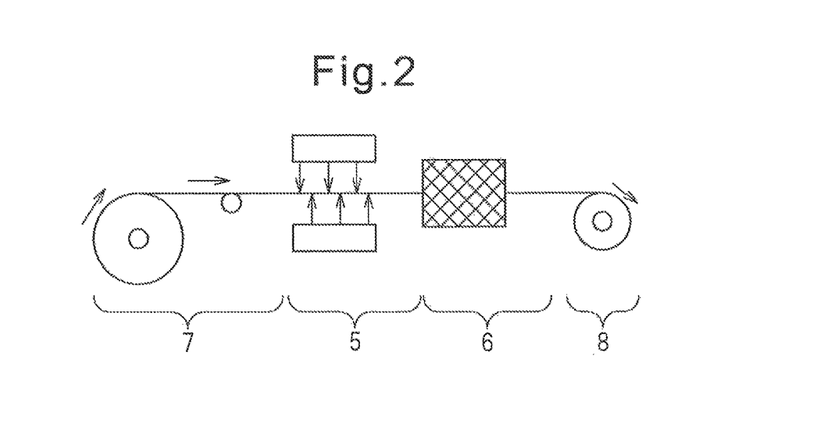
FIG. 2 is a conceptual drawing showing water jet processing of a spunbond nonwoven fabric.

The water jet processing is carried out by the process illustrated in FIG. 2, at a processing speed of 1-15 m/min. In this case, the power V of the fluid per nozzle, as represented by the following formula, is 0.5 to 15 W, preferably 1 to 13 W and more preferably 2 to 10 W. Also, the nozzle spacing is preferably 1.0 to 2.5 mm and more preferably 1.5 to 2.0 mm. The water jet processing frequency must be at least once on both the front and back sides, in order to minimize variation in the void percentage in the thickness direction.

During the water jet processing, the power W of fluid per nozzle was calculated by the following formula, with reference to Japanese Unexamined Patent. Publication No. 2008-127696.

$$V = 60[2\ g(P1-P2)10{,}000/(1000\rho)]^{0.5}$$

{In the formula:
V: Flow rate of fluid discharged from nozzle [m/min]
g: Gravity acceleration=9.8 [m/s²]
P1: Fluid waiter pressure [kgf/cm²]
P2: Atmospheric pressure=1.03 [kgf/cm²]
ρ: Fluid density [g/cm³].}

$$F = 100V(S/100)$$

{In the formula:
F: Flow rate of fluid discharged from each nozzle hole [cm³/min]
S: Area of fluid discharged from each nozzle hole [mm²]
V: Flow rate of fluid discharged from nozzle [m/min].}

$$W = 0.163 P1 (F/100)$$

{In the formula:
W: Power of fluid per nozzle hole [W]
P1: Fluid water pressure [kgf/cm²]
F: Flow rate of fluid discharged from each nozzle hole [cm³/min].}

Various combinations may be selected for WJ-SB based on the spun lace nonwoven fabric diameter, in order to more effectively exhibit a graded function. That is, depending on the construction of the spun lace nonwoven fabric, a single WJ-SB may be used, or several layered WJ-SBs with different fiber diameters may be used, which are formed using spunbond nonwoven fabrics with different fiber diameters. The optimal layered structure may be selected in consideration of balance between the fine particle capture efficiency, filter life, initial pressure loss and cost required for a filter material.

Table 3 below shows the results of the respective filter properties for filter materials produced with combinations of obtained spun lace nonwoven fabrics, WJ-SBs and spunbond nonwoven fabrics and monofilament woven fabrics used as reinforcing materials.

A suction filter usually has a pouch form as shown in FIG. 2 of PTL 1 and FIG. 1 of PTL 2, with a spacing member in the interior in order to prevent she inner side of the pouch from bonding together and inhibiting flow of fuel. Also, the spacing member has aggregate-like protrusions and is in contact with the surface of the downstream layer of the filter material, in order to consistently form an appropriate interior space. Because of this, vibrations during vehicle running and the like can potentially cause breakage of the fibers of the filter material in contact with the protrusions, which when progressing can result in freeing of the broken fibers from the filter material and their infiltration into the fuel pump, potentially leading to damage of the fuel pump. In order to eliminate this problem, the lowermost flow section of the filter material may employ a monofilament woven fabric that is considered to have higher monofilament strength compared to an ordinary nonwoven fabric. This can prevent breakage of the fibers caused by contact between the spacing member of the suction filter and the filter material, to obtain a filter material with high reliability in terms of strength.

In order to prevent variations in the opening sizes due to running vibrations of the vehicle, and thus penetration of the protrusions of the spacing member into the woven texture that has wide spacings, the fiber diameter of the monofilament woven fabric is preferably 30 to 170 μm and the number of fibers per inch is preferably 20 to 70. If the fiber diameters are within the aforementioned range it will be possible to adequately widen the spaces between fibers, and it will be possible to minimize pressure loss caused by the woven fabric, without inhibiting passage of fuel. In addition, if the number of fibers per inch is within the range specified above, even if variation occurs in the opening sizes due to vehicle vibration and the like, the adjacent fibers will contact, and it will be possible to limit variation in the opening sizes to a sufficiently low degree of variation with respect to the contact area of the protrusions.

In consideration of the service life and cost required for a filter, a spunbond nonwoven fabric or the like may be used as the reinforcing material instead of a monofilament woven fabric. In this case as well, it is possible to prevent direct contact between the staple fibers in the downstream layer of the spun lace nonwoven fabric used as the filter material, and the aforementioned protrusions, and to prevent exudation of the staple fibers due to breakage and freeing of the staple fibers.

The outer layer portion of the filter may be layered with an ordinary spunbond nonwoven fabric or monofilament woven fabric, in order to prevent the outer side of the pouch form from adhering to the inner side of the fuel tank and inhibiting flow of fuel, and prevent the fibers used in the filter material from breaking sac being freed due to contact with the inner side of the fuel tank.

Bonding between each of the obtained nonwoven fabrics and the reinforcing material may be by any of various bonding methods using an ultrasonic welder, heat sealing, calendering, an adhesive or the like. Bonding with partial melting using an ultrasonic welder is a preferred method, to allow the filter material to be produced while maintaining the thickness and void structure.

EXAMPLES

The present invention will now be explained in greater detail by examples.

The properties measured in the examples were measured by the following methods.

(1) Basis Weight (Weight Per Unit Area) [g/m²]

This was measured by a method following the measuring method specified in JIS-L-1913-2010. Specifically, a 100 mm×100 mm sample was taken from at least 10 points in the widthwise direction and 3 points in the lengthwise direction of the supply fabric, and the weight of each taken sample was measured and calculated as g/m², determining the average value.

(2) Thickness [mm]

This was measured by a method following the measuring method specified in JIS-L-1913-2010. Specifically, the thickness was measured under a pressure of 0.5 kPa for the WJ-SB and the spunbond nonwoven fabric before WJ treatment, and under a pressure of 9.8 kPa for the other materials and the layered body of each material. The number of measurement points was 20, and the average value was calculated.

(3) Air Permeability [cm³/cm²/sec]

Measurement was conducted at three locations with a Frajour type tester conforming to JIS-L-1913-2010, and the average value was calculated.

(4) Fiber Diameter [μm]

The surface of the nonwoven fabric was magnified with a photomicrograph, the fiber diameter was measured at 10 points, and the average value was calculated.

(5) Void Percentage [%]

The basis weight and thickness of the nonwoven fabric were measured and calculation was performed by the following formula. A value of 1.38 was used for the specific gravity of polyethylene terephthalate.

Void percentage=(1−total volume of fiber composing nonwoven fabric/nonwoven fabric volume)×100

(6) Capture Efficiency [%]

Figure 7:
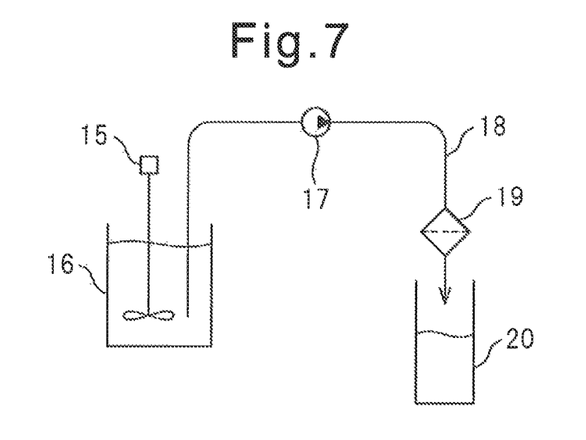
FIG. 7 is a flow chart showing the steps for capture efficiency measurement.

This was measured by the method shown in FIG. 7. Specifically, 7 types of testing dust as specified by JIS-Z-8901 was added onto water and agitated for one minute by ultrasonic vibration, for use as a test solution. The test solution was passed through a sample with an effective area of 12.5 cm² at a flow rate of 12 cc/min/cm², the test solution was collected before and after passage through the sample, and the particle size distribution of each solution was measured with a particle size distribution meter to determine the capture efficiency for each particle size. The amount of dust added to the test solution was adjusted so that the number of 10 μm particles before passage through the sample was about 3000. For particle size distribution measurement, an ACCUSIZER MODEL 1780SIS by PSS Co. was used as the measuring instrument, and the numbers of 10 μm, 20 μm and 30 μm particles were measured for the test solution before and after passage through the sample. The capture efficiency was determined by the following formula.

Capture efficiency [%]=(1−number of particles on exit side/number of particles on entrance side)×100

(7) Filter Life [Min]

Figure 8:
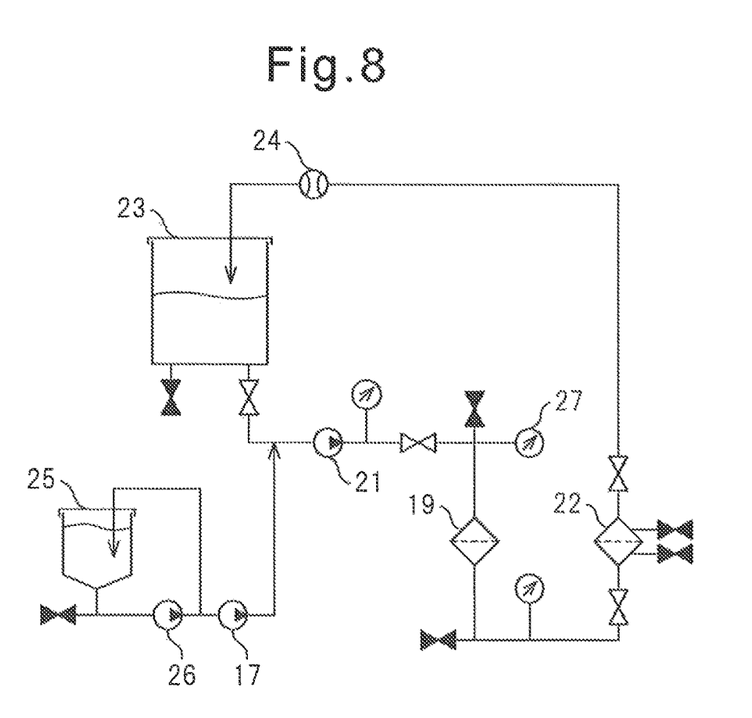
FIG. 8 is a flow chart showing a single-pass test used to evaluate filter life.
Figure 9:
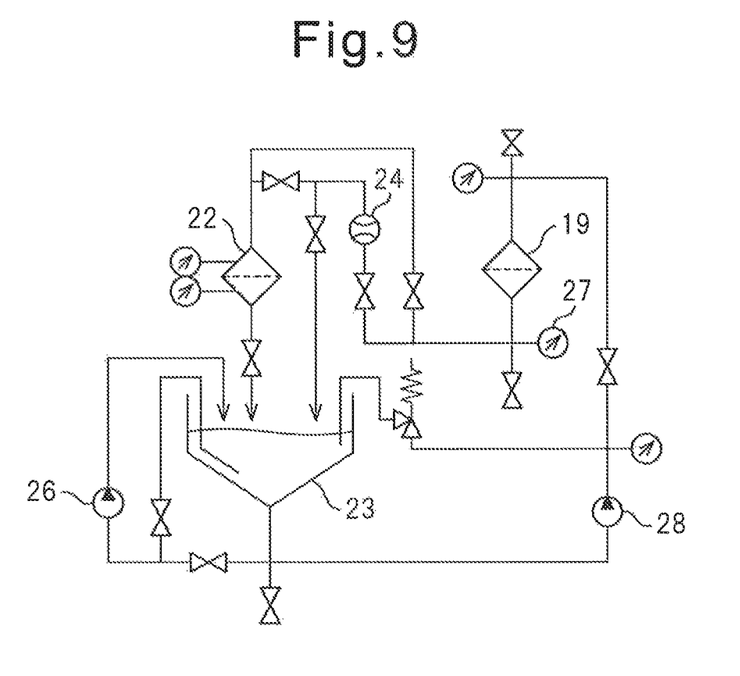
FIG. 9 is a flow chart showing a multi-pass test used to evaluate filter life.

The single-pass evaluation was conducted by the method shown in FIG. 8, and the multi-pass evaluation was conducted by the method shown in FIG. 9. Specifically, for the single-pass evaluation, 8 different testing dusts conforming to JIS-Z-8901 were added to No. 2 light oil conforming to JIS-K-2204 (hereunder also referred to as "JIS No. 2 light oil") in a proportion of 20 mg/L for use as the test solution, and the test solution was passed through a sample with an effective area of 12.5 cm$^2$ at a flow rate of 150 cc/min, measuring the time until the pressure loss in the sample reached 10 kPa and recording this as the filter life.

Specifically, for the multi-pass evaluation, 9.5 liter of JIS No. 2 light oil was passed through a sample with an effective area of 45.3 cm$^2$ at a flow rate of 1 L/rain, and 2.1 g of a mixture of 8 different testing dusts and 11 different testing dusts conforming to JIS-Z-8901 at a ratio of 1:2 were added to the JIS No. 2 light oil at 5 minute intervals, measuring the time until the pressure loss in the sample reached 10 kPa and recording this as the filter life.

During addition of the dust in the multi-pass evaluation, the 2.1 g of testing dust was taken in a 100 cc sample bottle and dried for 30 minutes in a thermostatic bath adjusted to 80° C., after which 100 cc of JIS No. 2 light oil was poured into the sample bottle and ultrasonically dispersed for 1 minute, and then poured into the light oil tank 23 shown in FIG. 9. Drying of the dust was in order to remove the moisture in the testing dust, and to prevent aggregation of the dust particles during the evaluation.

Also, for both the single-pass evaluation and multi-pass evaluation, 1 vol % of isopropyl alcohol was added, to the JIS No. 2 light oil used. This was to prevent aggregation of the dust particles due to static electricity produced by contact between dust particles, and to prevent the result of a different particle size distribution from the target of evaluation. For the same reason, for preparation of the dust solution in the dust solution tank 25 for single-pass evaluation as well, the dust particles to be added were dried for 30 minutes in a thermostatic bath adjusted to 80° C., and 1 vol % isopropyl alcohol was added to the dust solution.

(8) Durability Evaluation

Measurement was conducted at three locations by the Taber abrasion method specified by JIS-L-1913-2010, and the average value was calculated. Evaluation was continued using a CS-10 as the abrasive wheel according to the same specification, until a physical change was produced in the sample.

Examples 1 to 6

The fiber diameters of staple fibers composing spun lace nonwoven fabrics were changed as shown in Table 1 below, and the filter performance was compared. When Example 1 and Example 2 are compared, Example 2 is found to have an extended filter life but the dust capture efficiency was lower. Presumably, the lowered capture efficiency of the downstream layer reduced the volume of internally captured dust, thereby extending the filter life. Also, when Example 1 and Example 3 are compared, Example 3 is found to have a large fiber diameter between the upstream layer and the downstream layer, and therefore the dust capture efficiency is even lower compared to Example 2, and the filter life is extended. In contrast, in Example 4 which had a smaller fiber diameter of the downstream layer than Example 1, the capture efficiency was increased but it tended to have a shorter filter life. Also, with Example 5 and Example 6 in which the fiber diameter of the upstream layer was 23 μm, the dust capture efficiency was reduced compared to Example 1 and Example 2, and the filter life was shorter. This is because, due to the large difference in fiber diameter between the upstream layer and downstream layer, a sufficient graded function was not exhibited and the load of the downstream layer on the filter life was increased.

TABLE 1

| | Spunlace nonwoven fabric design | | | | | | | | |
|---|---|---|---|---|---|---|---|---|---|
| | Upstream layer | | | Intermediate layer | | | Downstream Layer | | |
| | Fiber diameter μm | L/D — | Basis weight g/m$^2$ | Fiber diameter μm | Basis weight g/m$^2$ | Comment | Fiber diameter μm | L/D — | Basis weight g/m$^2$ |
| Example 1 | 12.5 | 400 | 80 | 12.5 | 50 | Hydrophilicized | 11.5 | 520 | 90 |
| Example 2 | 12.5 | 400 | 80 | 12.5 | 50 | Hydrophilicized | 12.5 | 400 | 40 |
| Example 3 | 23 | 220 | 150 | 12.5 | 50 | Hydrophilicized | 17 | 300 | 100 |
| Example 4 | 12.5 | 400 | 100 | 12.5 | 50 | Hydrophilicized | 10 | 500 | 80 |
| Example 5 | 23 | 220 | 150 | 12.5 | 50 | Hydrophilicized | 11.5 | 520 | 80 |
| Example 6 | 23 | 220 | 150 | 12.5 | 50 | Hydrophilicized | 12.5 | 520 | 40 |
| Example 7 | 10 | 500 | 150 | 12.5 | 50 | Hydrophilicized | 7.5 | 700 | 80 |
| Example 8 | 10 | 500 | 150 | 12.5 | 50 | Hydrophilicized | 7.5 | 700 | 100 |
| Example 9 | 10 | 500 | 150 | 12.5 | 50 | Hydrophilicized | 7.5 | 700 | 120 |
| Example 10 | 10 | 500 | 150 | 12.5 | 50 | Hydrophilicized | 7.5 | 700 | 30 |
| Example 11 | 10 | 500 | 150 | 12.5 | 50 | Hydrophilicized | 7.5 | 700 | 15 |
| Example 12 | 10 | 500 | 150 | 12.5 | 50 | Hydrophilicized | 4 | 1250 | 50 |
| Example 13 | 10 | 500 | 150 | 12.5 | 50 | Non-hydrophilic | 4 | 1250 | 50 |
| Comp. Ex. 1 | 10 | 500 | 150 | | Woven fabric | | 4 | 1250 | 50 |
| Example 14 | 10 | 500 | 150 | 12.5 | 12 | Hydrophilicized | 4 | 1250 | 50 |
| Example 15 | 10 | 500 | 150 | 12.5 | 20 | Hydrophilicized | 4 | 1250 | 50 |

TABLE 1-continued

| | | | | | | | | | |
|---|---|---|---|---|---|---|---|---|---|
| Example 16 | 10 | 500 | 150 | 12.5 | 80 | Hydrophilicized | 4 | 1250 | 50 |
| Example 17 | 10 | 500 | 150 | 12.5 | 120 | Hydrophilicized | 4 | 1250 | 50 |
| Example 18 | 10 | 500 | 150 | 12.5 | 130 | Hydrophilicized | 4 | 1250 | 50 |
| Example 19 | 7.5 | 700 | 100 | 12.5 | 50 | Hydrophilicized | 4 | 1250 | 50 |
| Example 20 | 5 | 1000 | 80 | 12.5 | 50 | Hydrophilicized | 4 | 1250 | 50 |
| Example 21 | 10 | 500 | 150 | 12.5 | 50 | Hydrophilicized | 3 | 1670 | 50 |
| Example 22 | 7.5 | 700 | 150 | 12.5 | 50 | Hydrophilicized | 4 | 1250 | 50 |
| Example 23 | 4 | 1250 | 50 | 12.5 | 50 | Hydrophilicized | 7.5 | 700 | 150 |
| Example 24 | 10 | 500 | 150 | 12.5 | 50 | Hydrophilicized | 4 | 2800 | 50 |
| Example 25 | 10 | 500 | 150 | 12.5 | 50 | Hydrophilicized | 4 | 3750 | 50 |
| Example 26 | 10 | 500 | 150 | 12.5 | 50 | Hydrophilicized | 4 | 5000 | 50 |
| Example 27 | 23 | 130 | 80 | 12.5 | 50 | Hydrophilicized | 4 | 1250 | 50 |

| | Thickness mm | Air permeability $cm^3/cm^2/sec$ | Capture Efficiency | | | 10 kPa attainment time, single-pass min | 10 kPa attainment time, multi-pass min |
|---|---|---|---|---|---|---|---|
| | | | 10 μm % | 20 μm % | 30 μm % | | |
| Example 1 | 1.46 | 44.7 | 35 | 78 | 99 | 28 | 13 |
| Example 2 | 1.02 | 54.3 | 30 | 70 | 98 | 32 | |
| Example 3 | 1.74 | 60.0 | 22 | 40 | 70 | 41 | |
| Example 4 | 1.41 | 49.2 | 44 | 50 | 99 | 25 | |
| Example 5 | 1.63 | 44.1 | 30 | 72 | 99 | 24 | |
| Example 6 | 1.55 | 58.8 | 30 | 67 | 95 | 29 | |
| Example 7 | 1.30 | 19.8 | 56 | 92 | 99 | 33 | 15 |
| Example 8 | 1.36 | 14.1 | 69 | 96 | 100 | 31 | |
| Example 9 | 1.49 | 12.2 | 77 | 98 | 100 | 25 | |
| Example 10 | 1.05 | 27.0 | 65 | 84 | 96 | 38 | |
| Example 11 | 0.90 | 34.2 | 49 | 70 | 91 | 41 | |
| Example 12 | 1.20 | 13.8 | 85 | 98 | 100 | 20 | 12 |
| Example 13 | — | — | — | — | — | — | — |
| Comp. Ex. 1 | 0.95 | 9.6 | 96 | 99 | 100 | 15 | |
| Example 14 | 0.90 | 14.6 | | | | 17 | |
| Example 15 | 1.00 | 13.0 | | | | | |
| Example 16 | 1.29 | 13.6 | | | | | |
| Example 17 | 1.50 | 13.0 | | | | | |
| Example 18 | 1.60 | 12.5 | | | | | |
| Example 19 | 0.96 | 10.0 | 96 | 99 | 100 | 19 | |
| Example 20 | 0.98 | 9.4 | 97 | 99 | 100 | 17 | |
| Example 21 | 1.25 | 12.0 | 92 | 99 | 100 | 15 | |
| Example 22 | 1.21 | 9.9 | 89 | 97 | 100 | 21 | |
| Example 23 | 1.21 | 9.9 | 86 | 97 | 99 | 9 | |
| Example 24 | 1.41 | 17.7 | 82 | 96 | 99 | | |
| Example 25 | 1.40 | 17.5 | 81 | 96 | 99 | | |
| Example 26 | — | — | — | — | — | — | — |
| Example 27 | — | — | — | — | — | — | — |

Examples 7 to 11

The basis weights of staple fibers composing spun lace nonwoven fabrics were changed, and the filter performance was compared. When the basis weight of the downstream layer was 100 g/m² (Example 8) and 120 g/m² (Example 9) for the staple fibers of these examples, the capture efficiency was increased compared to when it was 80 g/m² (Example 7), but the filter life tended to be reduced. In addition, when the basis weight of the downstream layer was 30 g/m² (Example 10) and 15 g/m² (Example 11), the filter life was extended but the capture efficiency tended to be reduced.

Example 12 and Comparative Example 1

The filter performance was compared when using a hydrophilically treated spunbond nonwoven fabric (Example 12) and a woven fabric (Comparative Example 1) as the intermediate layer. The spun lace treatment shown in FIG. 3 was carried out for tangling of staple fibers with a fiber diameter of 10 μm and a basis weight of 150 g/m² in the upstream layer and staple fibers with a fiber diameter of 4 μm and a basis weight of 50 g/m² in the downstream layer.

These results demonstrated that when a spunbond nonwoven fabric is used in the intermediate layer, the filter life is longer than when a woven fabric is used in the intermediate layer. Since a woven fabric section does not allow fluid passage the particles are not captured, but when a spunbond nonwoven fabric is used in the intermediate layer, particles are captured in the intermediate layer as well, and therefore the amount of particles held in the entire spun lace nonwoven fabric increases and the filter life is lengthened.

Example 13

When a spunbond nonwoven fabric that was not hydrophilically treated was used as the intermediate layer (Example 13), air that had been incorporated during columnar stream treatment inhibited tangling between the staple fibers and the spunbond nonwoven fabric used as the intermediate layer. This created partial sections where the staple fibers have not been tangled with the intermediate layer, and sections where a proper spun lace nonwoven fabric was not formed, but the filter as a whole was usable. In contrast, when a hydrophilically treated spunbond nonwoven fabric was used as the intermediate layer (Example 12), air incorporated during columnar stream treatment was adequately discharged, and the staple fibers oriented on both sides of the spunbond nonwoven fabric were uniformly tangled. The hydrophilic treatment employed here was preparation of the nonionic surfactant NOPCO WET SN-20T by San Nopco, Ltd. at a concentration of 10%, and application using a kiss coater.

Examples 14 to 18

The structures of spunbond nonwoven fabrics used as intermediate layers for spun lace nonwoven fabrics were compared, with varying basis weights. With basis weights of 20 g/m$^2$ to 120 g/m$^2$ (Example 12 and Examples 15 to 17), no problems occurred during sheet formation and columnar stream treatment. In contrast, with a basis weight of 12 g/m$^2$ (Example 15), the staple fibers of the upstream layer and downstream layer migrated even to the layer on the opposite side, impairing the graded function and thus shortening the filter life. With a basis weight of 130 g/m$^2$ (Example 18), sheet formation and columnar stream treatment were possible but the drainage resistance was higher, and therefore more prolonged waste water treatment was necessary than the other examples, and during columnar stream treatment as well, it was necessary to extend the emptying time for air taken in.

Example 19 and Example 20

The fiber diameters of staple fibers of upstream layers composing spun lace nonwoven fabrics were changed, and the filter performance was compared. When the fiber diameter of the staple fibers of the upstream layer was reduced, the capture efficiency of the filter as a whole tended to increase but the filter life was shortened. This was presumably because the difference in diameter compared to the downstream layer was smaller and more clogging occurred in the upstream layer.

Example 21

The fiber diameters of staple fibers of downstream layers composing spun lace nonwoven fabrics were changed, and the filter performance was compared. When the fiber diameter of the staple fibers of the downstream layer was 3 μm (Example 21), the particle capture efficiency was higher but the filter life was short. This was presumably because more particles were captured in the downstream layer, and obstruction of the fine pores occurred in a shorter time than when the fiber diameter was 4 μm (such as in Example 12).

Example 22 and Example 23

Filter performance during fluid passage was compared after reversing the fiber diameter of the staple fibers arranged in the upstream layer and the fiber diameter of the staple fibers arranged in the downstream layer. In this case, the particle capture efficiency was essentially the same, but a large difference in filter life resulted. This indicates that, in order to extend the filter life, it is preferred to arrange staple fibers with larger fiber diameters in the upstream layer than in the downstream layer, and impart a graded function in which large-diameter particles are captured in order from the upstream layer.

Examples 24 to 26

The L/D ratios of staple fibers composing spun lace nonwoven fabrics were changed, and dispersibility of the staple fibers was compared. When L/D=1250 (Example 12), the dispersibility of the staple fibers was satisfactory during sheet formation. When L/D=2800 (Example 24) or L/D=3750 (Example 25), however, the dispersibility gradually decreased, and when L/D=5000 (Example 26) the dispersibility further decreased. Upon observing the state after sheet formation, a ratio of L/D=5000 caused the staple fibers to harden and resulted in a mixture of locations with staple fibers and locations without or with very few staple fibers. With a large L/D ratio, the dispersibility during sheet formation was reduced and variation in basis weight of the spun lace nonwoven fabric occurred, which was associated with variation in filter performance.

Example 27

The L/D ratios of staple fibers composing spun lace nonwoven fabrics were changed, and the tangling property of the staple fibers was compared. With a ratio of L/D=200 or greater (such as in Example 1, Example 3 and Example 20), the staple fibers were sufficiently tangled by columnar stream treatment, and detachment between the staple fiber layer and intermediate layer did not occur. With L/D<200 (Example 27), interlayer separation occurred after columnar stream treatment. This demonstrated that with an L/D ratio of less than 200, tangling does not sufficiently take place between the staple fibers and between the staple fibers and the intermediate layer.

Examples 28 to 36

Spunbond nonwoven fabrics contact bonded at low pressure and low temperature were used for water jet processing to obtain WJ-SBs (Examples 28 to 36). The water jet processing conditions were as shown in Table 2 below. In addition, as a condition for finishing, the sample was dried at 80° C. after water jet processing.

TABLE 2

|  | First pass (Front and back processing) | Second pass (Front and back processing) |
| --- | --- | --- |
| Water pressure [kgf/cm$^2$] | 30 | 50 |
| Nozzle diameter [mm] | 0.2 | 0.2 |
| Nozzle pitch [mm] | 2.0 | 2.0 |
| Number of rows | 1 | 3 |
| Processing speed [m/min] | 10 | 10 |
| Work [W] | 2.2 | 4.8 |

The construction of the produced WJ-SB and the filter performance of the WJ-SB are shown in Table 3 below. In Examples 28 to 30, spunbond nonwoven fabrics with fiber diameters of 13.5 μm were used to yield products with basis weights of 40 to 120 g/m$^2$. Also, in Examples 31 to 33, spunbond nonwoven fabrics with fiber diameters of 12.5 μm were used to yield products with basis weights of 40 to 120 g/m$^2$. In Examples 34 to 36, spunbond nonwoven fabrics with fiber diameters of 11 μm were used to yield products with basis weights of 40 to 120 g/m$^2$.

The filter performance varied according to the fiber diameter and basis weight, similar to the spun lace nonwoven fabrics. Specifically, a smaller fiber diameter improved the dust capture efficiency, and consequently shortened the filter life. The WJ-SBs were layered on spun lace nonwoven fabrics according to the performance required for filters, and it was possible to obtain an effect of extending the filter life of the spun lace nonwoven fabrics (see Examples 37 to 40 below).

TABLE 3

| No. | Fiber diameter μm | Basis weight g/m² | Pre-WJ thickness mm | Post-WJ thickness mm | Air permeability cm³/cm²/sec | Capture efficiency 10 μm % | 20 μm % | 30 μm % | 10 kPa attainment time single-pass min |
|---|---|---|---|---|---|---|---|---|---|
| Example 28 | 13.5 | 120 | 0.51 | 1.20 | 128 | 55 | 72 | 80 | 54 (3-ply) |
| Example 29 | 13.5 | 80 | 0.35 | 0.87 | 167 | 34 | 64 | 73 | 78 (3-ply) |
| Example 30 | 13.5 | 40 | 0.20 | 0.52 | | | | | |
| Example 31 | 12.5 | 120 | 0.51 | 1.05 | 112 | 60 | 75 | 86 | 50 (3-ply) |
| Example 32 | 12.5 | 80 | 0.34 | 0.78 | 134 | 45 | 65 | 74 | 91 (3-ply) |
| Example 33 | 12.5 | 40 | 0.20 | 0.95 | | | | | |
| Example 34 | 11 | 120 | 0.42 | 1.12 | 104 | 62 | 80 | 89 | 35 (3-ply) 69 (single-sheet) |
| Example 35 | 11 | 80 | 0.29 | 0.83 | 130 | 54 | 72 | 78 | 42 (3-ply) 74 (single-sheet) |
| Example 36 | 11 | 40 | 0.18 | 0.60 | | | | | |

Examples 37 to 40

Table 4 below shows the filter performance with layering of WJ-SBs on spun lace nonwoven fabrics.

In Example 37, each of the filter materials was layered as follows, in order from the upstream end in terms of fluid passage.
(1-1) Plain weave, 50 mesh monofilament woven fabric with fiber diameter of 70 μm.
(1-2) WJ-SB of Example 29
(1-3) WJ-SB of Example 32
(1-4) Spun lace nonwoven fabric of Example 1
(1-5) Spunbond nonwoven fabric with fiber diameter of 13.5 μm and basis weight of 25 g/m².

In Example 38, each of the filter materials was layered as follows, in order from the upstream end in terms of fluid passage.
(2-1) Plain weave, 50 mesh monofilament woven fabric with fiber diameter of 70 μm.
(2-2) WJ-SB of Example 29
(2-3) WJ-SB of Example 32
(2-4) WJ-SB of Example 35
(2-5) Spun lace nonwoven fabric of Example 7
(2-6) Spunbond nonwoven fabric with fiber diameter of 13.5 μm and basis weight of 25 g/m².

In Example 39, each of the filter materials was layered as follows, in order from the upstream end in terms of fluid passage.
(3-1) Plain weave, 50 mesh monofilament woven fabric with fiber diameter of 70 μm.
(3-2) WJ-SB of Example 29
(3-3) WJ-SB of Example 32
(3-4) WJ-SB of Example 35
(3-5) Spun lace nonwoven fabric of Example 12
(3-6) Spunbond nonwoven fabric with fiber diameter of 13.5 μm and basis weight of 25 g/m².

In Example 40, each of the filter materials was layered as follows, in order from the upstream end in terms of fluid passage.
(4-1) Plain weave, 50 mesh monofilament woven fabric with fiber diameter of 70 μm.
(4-2) WJ-SB of Example 29
(4-3) WJ-SB of Example 32
(4-4) WJ-SB of Example 35
(4-5) WJ-SB of Example 35
(4-6) Spun lace nonwoven fabric of Example 12
(4-7) Spunbond nonwoven fabric with fiber diameter of 13.5 μm and basis weight of 25 g/m².

In all of the examples, layering the WJ-SB produced an effect of extending the filter life while maintaining capture efficiency. This is because layering WJ-SBs with different fiber diameters imparted a graded function as a prefilter and extended the life of the spun lace nonwoven fabric.

During the layering, each filter material was stacked and partially melt bonded using an ultrasonic welder. The partial bonding was in a melting area of 3 mm² per point, with a regular triangular arrangement at 19 to 21 mm spacings.

TABLE 4

| | Structure | Air permeability cm³/cm²/sec | Capture efficiency 10 μm % | 20 μm % | 30 μm % | 10 kPa attainment time single-pass min | 10 kPa attainment time multi-pass min |
|---|---|---|---|---|---|---|---|
| Example 1 | See Table 1 | 44.7 | 35 | 78 | 99 | 28 | 13 |
| Example 37 | WJ-SBs of Examples 29, 32 layered on spunlace nonwoven fabric of Example 1, with monofilament woven fabric on upstream side and spunbond nonwoven fabric on downstream side. | 31.2 | | | | 62 | 25 |
| Example 7 | See Table 1 | 19.8 | 56 | 92 | 99 | 33 | 15 |
| Example 38 | WJ-SBs of Examples 29, 32, 35 layered on spunlace nonwoven fabric of Example 7, with monofilament woven fabric on upstreamside and spunbond nonwoven fabric on downstream side. | 13.6 | 89 | 99 | 100 | 53 | 24 |

TABLE 4-continued

|  | Structure | Air permeability cm³/cm²/sec | Capture efficiency 10 μm % | Capture efficiency 20 μm % | Capture efficiency 30 μm % | 10 kPa attainment time single-pass min | 10 kPa attainment time multi-pass min |
|---|---|---|---|---|---|---|---|
| Example 12 | See Table 1 | 13.8 | 85 | 98 | 100 | 20 | 12 |
| Example 39 | WJ-SBs of Examples 29, 32, 35 layered on spunlace nonwoven fabric of Example 12, with monofilament woven fabric on upstreamside and spunbond nonwoven fabric on downstream side. | 10.9 | 92 | 100 | 100 | 37 | 14 |
| Example 40 | WJ-SBs of Examples 29, 32, 35 layered on spunlace nonwoven fabric of Example 12, with monofilament woven fabric on upstreamside and spunbond nonwoven fabric on downstream side. | 10.1 | 92 | 100 | 100 | 39 | 15 |

Figure 6:
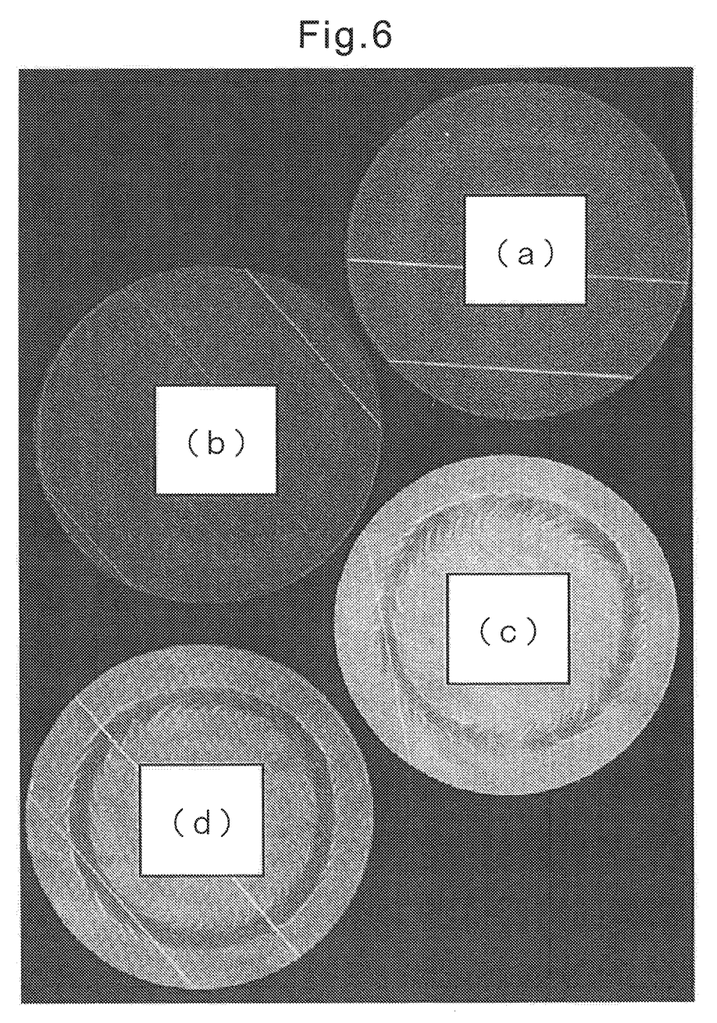
FIG. 6 is an observational photograph showing the state of wear of a sample after a durability evaluation conducted for the following monofilament woven fabrics and spunbond nonwoven fabrics.

FIG. 6 shows a sample photograph after durability evaluation. The samples used were polyethylene terephthalate monofilament woven fabrics, having (a) a fiber diameter of 150 μm and 45 fibers per inch, and (b) a fiber diameter of 70 μm and 50 fibers per inch. As comparative samples there were used polyethylene terephthalate spunbond nonwoven fabrics with fiber diameters of 13.5 μm having basis weights of (c) 40 g/m² and (d) 25 g/m². It is seen that the monofilament woven fabrics had drastically superior durability compared to the spunbond nonwoven fabrics.

Figure 10:
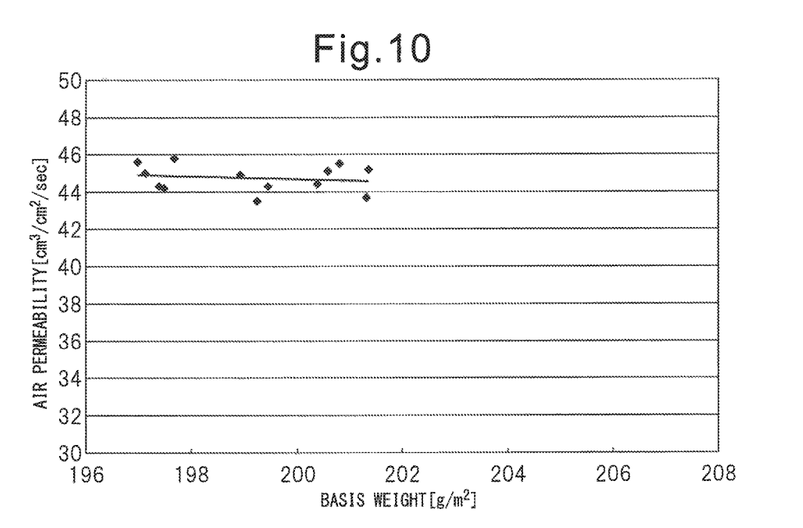
FIG. 10 is a graph showing the correlation between basis weight and air permeability of the spun lace nonwoven fabric of Example 1.
Figure 11:
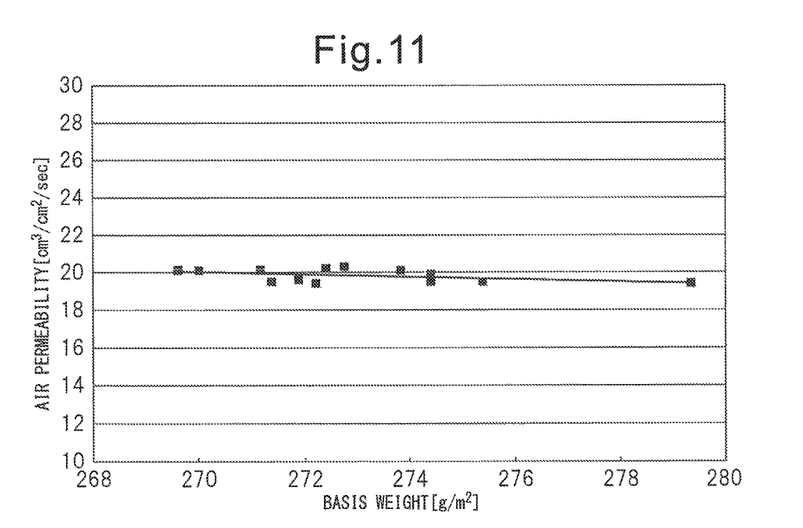
FIG. 11 is a graph showing the correlation between basis weight and air permeability of the spun lace nonwoven fabric of Example 7.

Table 5, FIG. 10 (Example 1) and FIG. 11 (Example 7) below show the measurement results for the basis weight and air permeability of spun lace nonwoven fabrics (Example 1 and Example 7) and a spunbond nonwoven fabric (Comparative Example 2). In Table 5, "R" represents the difference between the maximum values and minimum values of the basis weight and air permeability, "Y" represents the standard deviation for the basis weight and air permeability, and "CV value" represents the ratio between the standard deviation and average value, i.e. the coefficient of variation, expressed as a percentage. These results demonstrate that the spun lace nonwoven fabrics of Example 1 and Example 7 have low variation in basis weight and air permeability compared to the spunbond nonwoven fabric of Comparative Example 2. Since the basis weight and air permeability referred to here are fundamental physical properties of the filter material directly related to filter performance, it is clear that the spun lace nonwoven fabrics have low variation in filter performance compared to the spunbond nonwoven fabric. Staple fibers having an L/D ratio in the range specified above can be uniformly dispersed by a wet sheeting method or the like, and the spun lace nonwoven fabrics used for the invention have the sheets formed by this method tangled by a columnar stream. It is for this reason presumably that it is possible to obtain higher dispersibility of fibers and more uniform filter performance compared to spunbond nonwoven fabrics produced by publicly known methods, even with comparison within small areas.

TABLE 5

|  |  | Mean value | Maximum value | Minimum value | R | σ | CV value |
|---|---|---|---|---|---|---|---|
| [Example 1] Spunlace nonwoven fabric | Basis weight | 199.13 | 201.36 | 196.99 | 4.37 | 1.65 | 0.83 |
|  | Air permeability | 44.73 | 45.80 | 43.50 | 2.30 | 0.72 | 1.62 |
| [Example 7] Spunlace nonwoven fabric | Basis weight | 272.99 | 279.34 | 269.62 | 9.72 | 2.57 | 0.94 |
|  | Air permeability | 19.82 | 20.30 | 19.40 | 0.90 | 0.03 | 0.13 |
| [Comp. Ex. 2] Spunbond nonwoven fabric | Basis weight | 129.90 | 136.20 | 123.50 | 12.70 | 2.79 | 2.15 |
|  | Air permeability | 12.98 | 28.00 | 14.50 | 13.50 | 2.89 | 13.78 |

INDUSTRIAL APPLICABILITY

The present invention is a filter material comprising a spun lace nonwoven fabric containing a thermoplastic synthetic filament nonwoven fabric as the intermediate layer, and because it has a longer filter life and lower cost than the prior art, it can be suitably used as a filter material for a suction filter that is to be employed on the primary side of a fuel pump situated in a vehicle fuel tank.

EXPLANATION OF SYMBOLS

1 Sheet-formed web before tangling treatment
2 Sheet-formed web after tangling treatment
3a Staple fibers
3b Staple fibers
4 Intermediate layer (woven fabric)
5 Water jet step
6 Drying step
7 Reel off step
8 Reel up step
9a Staple fiber slurry
9b Staple fiber slurry
10 Intermediate layer
11 Sheet-forming step
12 Staple fibers (upstream layer)
13 Staple fibers (downstream layer)
14 Intermediate layer (nonwoven fabric made from filaments)

15 Agitator
16 Dust solution tank
17 Tube pump
18 Tube
19 Sample filter
20 Sampling bottle
21 Magnet gear pump
22 Clean-up filter
23 Light oil tank
24 Flowmeter
25 Dust solution tank
26 Agitation pump
27 Pressure gauge
28 Rotating positive-displacement uniaxial eccentric screw pump

What is claimed is:

1. A filter material for vehicle fuel, comprising a spun lace nonwoven fabric which contains a thermoplastics synthetic filament nonwoven fabric as an intermediate layer,
wherein the thermoplastic synthetic filament nonwoven fabric as the intermediate layer is treated with a hydrophilic agent and is a spunbond nonwoven fabric having a fiber diameter of 5 to 30 μm and a basis weight of 20 to 160 g/m², and a layer on one side of the spunbond nonwoven fabric is composed of staple fibers with a fiber diameter of 2 to 15 μm and a basis weight of 30 to 100 g/m², while a layer on a second side is composed of staple fibers with a fiber diameter of 7 to 25 μm and a basis weight of 50 to 200 g/m²,
wherein the fiber diameter of the staple fibers used in the layer on the one side is smaller than the fiber diameter of the staple fibers used in the layer on the second side, and
wherein the spun lace nonwoven fabric is a nonwoven fabric having the staple fibers formed into a web and the fibers tangled with the spunbond nonwoven fabric, by a high-pressure water jet of a high-pressure columnar stream.

2. A filter material according to claim 1, wherein the staple fibers having a fiber diameter of 2 to 15 μm and a basis weight of 30 to 100 g/m² have an aspect ratio (L/D) of between 200 and 4000 wherein their fiber length is L and fiber diameter is D, and the staple fibers having a fiber diameter of 7 to 25 μm and a basis weight of 50 to 200 g/m² also have an aspect ratio (L/D) of between 200 and 4000 wherein their fiber length is L and fiber diameter is D.

3. A filter material according to claim 1, which is further layered with a spunbond nonwoven fabric that has been pretreated with a water jet, as a pretreatment layer.

4. A filter material according to any one of claim 1, 2 or 3, which is capable of capturing at least 90% of particles of 30 μm and greater, and which has a filter life of at least 30 minutes as measured by a method pursuant to JIS-B-8356-8.

5. A filter material according to any one of claim 1, 2 or 3, which is capable of capturing at least 90% of particles of 20 μm and greater, and which has a filter life of at least 25 minutes as measured by a method pursuant to JIS-B-8356-8.

6. A filter material according to any one of claim 1, 2 or 3, which is capable of capturing at least 90% of particles of 10 μm and greater, and which has a filter life of at least 20 minutes as measured by a method pursuant to JIS-B-8356-8.

7. A filter material having a monofilament woven fabric with a fiber diameter of 30 μm to 170 μm layered on the one side of a filter material according to any one of claim 1, 2 or 3.

8. A filter for vehicle fuel, obtained by heat sealing edge perimeters on the second side of a filter material according to any one of claim 1, 2 or 3 to produce a pouch form.

9. A filter for vehicle fuel formed by heat sealing edge perimeters of a filter material having a monofilament woven fabric with a fiber diameter of 30 μm to 170 μm layered on the one side of a filter material according to any one of claim 1, 2 and or 3, to form a pouch form.

* * * * *